United States Patent [19]

Delseth et al.

[11] Patent Number: 4,605,590

[45] Date of Patent: Aug. 12, 1986

[54] RUBBER/METAL COMPOSITES

[75] Inventors: Jean-Marc Delseth, Gembloux; Albert F. Devaux, Mont Saint Guibert; Eric R. Lynch, Brussels, all of Belgium

[73] Assignee: Monsanto Europe S. A., Brussels, Belgium

[21] Appl. No.: 764,706

[22] Filed: Aug. 12, 1985

[30] Foreign Application Priority Data

Aug. 23, 1984 [GB] United Kingdom ............... 8421432

[51] Int. Cl.⁴ .................. B32B 15/06; B32B 25/12; B60C 9/04
[52] U.S. Cl. ................... 428/295; 156/124; 428/465; 428/625; 428/639; 524/392; 525/343
[58] Field of Search ............. 428/295, 465; 156/124

[56] References Cited

U.S. PATENT DOCUMENTS 3,905,947 9/1975 Cowell et al. .................. 260/79.5

OTHER PUBLICATIONS

Chemical Abstracts 83(8): 60571k.
Chemical Abstracts 89(20): 164706y.
Chemical Abstracts 95(8): 63176u.
Chemical Abstracts 97(20): 164294c.
Chemical Abstracts 98(8): 55138e.

Primary Examiner—James C. Cannon
Attorney, Agent, or Firm—Gordon B. Seward

[57] ABSTRACT

The bond strength between a sulphur-vulcanizable rubber and a metal, especially brass, is increased by using as bonding promoter a compound having the formula

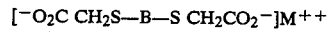

or a hydrate thereof, where B represents a divalent organic radical and M represents cobalt or nickel.

16 Claims, No Drawings

RUBBER/METAL COMPOSITES

This invention relates to the bonding of rubber to metal.

Articles in which rubber is bonded to metal have been known for many years, and since the introduction of the steel-belted radial tire, rubber/metal bonding has been very extensively studied. It is known that certain substances will act as adhesion promoters to improve the initial adhesion level between the rubber and the metal and the maintenance of the adhesion level during accelerated laboratory ageing tests designed to simulate conditions to which the article may be subjected during its service life.

The main adhesion promoters currently used to promote the bonding of brass-coated steel to rubber are cobalt compounds such as cobalt naphthenate, and resorcinol-and/or melamine-formaldehyde resins used in conjunction with hydrated silica. Both of these types of adhesion promoters, which can be employed separately or in combination, have limitations, and alternative rubber/metal adhesion promoters to those currently employed are therefore desirable.

U.S. Pat. No. 3,905,947 entitled "Organo-nickel salts as adhesion promoters for vulcanizable elastomers to metals" discloses promoters of the general formula (Organic Ligand) Nickel (Anion) including a sub-class where the ligand and anion are apparently the same, and are monocarboxylates represented by the general formula $(RS(CH_2)_nCO_2-)$ where R has various values, including alkyl containing from 4 to 24 carbon atoms, and n has a value of 1 or 2.

We have found that these compounds do indeed act as rubber/metal adhesion promoters so far as the strength of the rubber/metal bond immediately after vulcanisation of the rubber is concerned. However, the strength of the bond has low resistance to ageing under a variety of conditions. We have found that promoters which are dicarboxylate derivatives of the formula given below provide rubber/metal bonds which have appreciably greater resistance to ageing.

A rubber/metal composite of the invention comprises a sulphur-vulcanisable rubber composition containing sulphur, a vulcanisation accelerator, a component having a metal surface in contact with the composition and, as a rubber/metal adhesion promoter, a compound having the formula $$[^-O_2C\ CH_2S-B-S\ CH_2CO_2^-]\ M^{++}$$

or a hydrate thereof, where B represents a divalent organic radical and M represents cobalt or nickel.

The invention also includes a vulcanised rubber article obtained by heating a composite of the invention at vulcanisation temperature to vulcanise the rubber.

The nature of the divalent organic radical B in the above formula of the adhesion promoter is not critical, and will generally be selected according to the availability and cost of materials required to produce the adhesion promoter. B can be, for example, a straight- or branched-chain alkylene radical containing from 1 to 16, preferably 2, 3, 4 or from 5 to 16 carbon atoms, or an analogous radical containing from 2 to 16, preferably from 4 to 16 carbon atoms and one or more double or triple bonds, for example an alkenylene or alkadienylene radical. Examples of such radicals are ethylene, pentamethylene, hexamethylene, octamethylene, nonamethylene, decamethylene, dodecamethylene, 3-methyl-1,5-pentylene, 1,4-but-2-enylene, 1,6-hex-2-enylene and 1,8-octa-2,6-dienylene.

In other instances, B has a structure comprising two or more alkylene units, each containing, for example, from 1 to 20 carbon atoms, pairs of such units being linked through an oxygen or sulphur atom, through a group $-SO_2-$, $-CO-$ or $-COO-$, or through an arylene or cycloalkylene radical. Representative of such structures are those of the formulae $$-(CH_2)_a-O-(CH_2)_a-$$

$$-(CH_2)_a-O-(CH_2)_{a'}-O-(CH_2)_a-$$

$$-(CH_2)_b-CO-(CH_2)_b-$$

$$-(CH_2)_c-COO-(CH_2)_a-$$

$$-(CH_2)_c-COO-Y-COO-(CH_2)_c-$$

and $$-(CH_2)_d-SO_2-(CH_2)_d-$$

where each a, a' and c independently represents an integer of from 1 to 20, each b independently represents an integer of from 1 to 10, each d independently represents an integer of from 2 to 20, and Y represents a group $-(CH_2)_c-$ or a group $-(CH_2CH_2O)_eCH_2CH_2-$ where e represents an integer from from 1 to 5. Preferred values for a are from 1 to 8, for example from 3 to 8, preferred values for a' are from 1 to 6, preferred values for b are 1 to 4, preferred values for c are from 1 to 18, for example from 3 to 12, and preferred values for d are from 2 to 12. Where values of a, a', b, c, d or e exceed 2, the alkylene radicals can be straight chain or branched.

Examples of radicals having a pair of alkylene units linked through an arylene radical are those of the formula $-CH_2ArCH_2-$ where Ar represents m-phenylene, p-phenylene, 1,4-naphthylene or 1,5-naphthylene.

Alternatively, B can be a cycloalkylene or alkylenecycloalkylene group. In such groups, the ring is usually cyclopentylene or cyclohexylene. The alkylene radical in alkylenecycloalkylene groups can have, for example, from 1 to 6 carbon atoms arranged in either a straight or branched chain. Also included are groups in which the ring in cycloalkylene or alkylenecycloalkylene groups carries up to three alkyl substituents, each of which typically has 1-4 carbon atoms, for example methyl, ethyl, or isopropyl. Examples of these cycloalkylene and alkylenecycloalkylene groups are 1,4-cyclohexylene; (2'-ethylene)cyclohexylene groups, e.g. 4(2'-ethylene)cyclohexylene; (2'-ethylene)methylcyclohexylene groups, e.g. 4(2'-ethylene)-3-methylcyclohexylene; (2'-isopropylene)cyclohexylene groups; and (2'-isopropylene) methylcyclohexylene groups, e.g. 2-methyl-5(2'-isopropylene) cyclohexylene.

The rubber/metal adhesion promoters described above are especially effective in compositions in which the rubber is cis-polyisoprene, either natural or synthetic, and in blends containing at least 25% by weight of cis-polyisoprene with other rubbers. Preferably the rubber, if a blend, contains at least 40% and more preferably at least 60% by weight of cis-polyisoprene. Examples of other rubbers which may be blended with cis-polyisoprene include poly-1,3-butadiene, copolymers of 1,3-butadiene with other monomers, for example styrene, acrylonitrile, isobutylene and methyl methacrylate, ethylenepropylene-diene terpolymers, and halogen-containing rubbers such as chlorobutyl, bromobutyl and chloroprene rubbers.

In the compositions of the invention the essential vulcanising agent is sulphur, but other vulcanising agents such as amine disulphides need not be excluded. The amount of sulphur in the compositions is typically from 2 to 6 parts, by weight per 100 parts by weight of rubber, with a preferred range being from 2.5 to 4 parts per 100 parts by weight of rubber. An advantage of of the adhesion promoters of the invention over the conventionally-used cobalt compounds is that they are effective at lower sulphur levels. The principal significance of this is that over the range of sulphur levels that gives vulcanisates of acceptable physical properties, those vulcanisates prepared using lower levels of sulphur show greater resistance to reversion and oxidative ageing than those prepared using higher levels of sulphur.

The preferred vulcanisation accelerators for use in the present invention are the benzothiazole-2-sulphenamides for instance N-isopropyl-benzothiazole-2-sulphenamide, N-tert-butyl-benzothiazole-2-sulphenamide, N-cyclohexylbenzothiazole-2-sulphenamide, N,N-dicyclohexylbenzothiazole-2-sulphenamide and 2(morpholinothio) benzothiazole. A single accelerator or a mixture of accelerators may be used. Best results are usually obtained using the benzothiazole-2-sulphenamides which have relatively long induction times, for example N,N-dicyclohexyl benzothiazole-2-sulphenamide and 2(morpholinothio)benzothiazole. In the compositions of the invention, these are usually used in amounts of from 0.3 to 2, preferably from 0.4 to 1.0 and more preferably from 0.5 to 0.8, parts by weight per 100 parts by weight of rubber.

The adhesion promoters defined above are very effective in promoting bonding between rubber and brass, for example the bonding between rubber and brass-coated steel. The brass typically has a copper content of from 60 to 70% by weight, with the optimum percentage depending on the particular conditions under which the bond is formed. The brass coating on brass-coated steel can have a thickness of, for example, from 0.07 to 0.7 micrometer. Rubber can also be bonded effectively to alloys of copper and zinc containing small amounts of one or more other metals, for example cobalt, nickel or iron.

Mixtures of different compounds of the above formula can be used as adhesion promoters in a composite of the invention. Moreover, it is possible to use a mixture of a complex of the present invention with one or more of the organic thiosulphates disclosed in European Patent Application No. 8387 0109.2 and/or with other types of adhesion promoters. These include the metal/phosphorous/boron compounds described in GB-A-2 022 087, and cobalt soaps.

The amount of adhesion promoter which, as indicated above, may be a single compound or a mixture, employed in the present invention is preferably from 0.5 to 4, for example from 0.5 to 2.5 or from 1 to 3, parts by weight per 100 parts by weight of rubber.

The adhesion promoters used in this invention can be incorporated into rubber by conventional mixing procedures, for example by adding them in a Banbury mixer or by adding them to the rubber on a mill. Ordinarily, with low melting solid additives, no special precautions are necessary for obtaining good dispersions. However, when using higher melting solids it is recommended that they be ground to a fine powder, preferably 70 micrometer particle size or less, to ensure adequate dispersion. In certain instances, it is convenient to add a solid adhesion promoter as a predispersion of particulate material in a rubber-compatible hydrocarbon oil or polymer, for example EPDM rubber.

Additives which are conventionally present in rubber compositions which are to be bonded to metal, are normally used in the vulcanisable compositions of the present invention. Such additives include carbon black, usually a carbon black of the N300 series such as N347 or N326, which typically is used in an amount of from 40 to 70 parts by weight per 100 parts by weight of rubber. Other such additives are, for example, zinc oxide, which may be used in an amount of, for instance, from 2 to 10 parts by weight per 100 parts by weight of rubber; stearic acid at a level of, for instance, from 0.5 to 2 parts by weight per 100 parts by weight of rubber; hydrocarbon softeners and extender oils; antidegradants, for example N-alkyl-N'-phenyl-p-phenylenediamines; and tackifiers. Other fillers may be used, for example silica, and the rubber stocks may also contain metal oxide activators other than zinc oxide, for example magnesium oxide, boric acid and borates, phenolic, resorcinol and/or melamine adhesive resins, and prevulcanisation inhibitors, for instance N-cyclohexylthiophthalimide. The metal surface to which the rubber is to be bonded can be subjected to various pretreatments, for example to ensure complete cleanliness or to confer corrosion resistance.

The following compounds were evaluated as rubber/metal adhesion promoters:

| Formula (excluding possible water of crystallisation) | |
|---|---|
| $[^-O_2CCH_2S-(CH_2)_6-SCH_2CO_2^-]Ni^{++}$ | 1 |
| $[^-O_2CCH_2S-(CH_2)_6-SCH_2CO_2^-]Co^{++}$ | 2 |

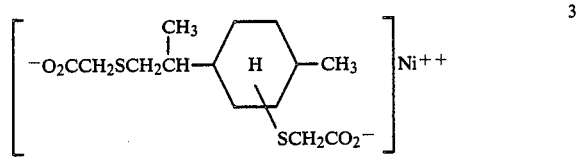

| | |
|---|---|
| $[C_6H_5CH_2SCH_2CO_2^-]_2Ni^{++}$ | 4 |
| $[C_{12}H_{25}SCH_2CO_2^-]_2Ni^{++}$ | 5 |
| $[^-O_2CCH_2SCH_2CH=CHCH_2SCH_2CO_2^-]Ni^{++}$ | 6 |
| $[^-O_2CCH_2SCH_2CH_2SCH_2CO_2^-]Ni^{++}$ | 7 |
| $[^-O_2CCH_2SCH_2ArCH_2SCH_2CO_2^-]Ni^{++}$ | 8 |

(where Ar is 1,4-$C_6H_4$)

Compounds Nos. 1, 2, 3, 6, 7 and 8 are rubber/metal adhesion promoters in accordance with the present invention. Compound No. 5 is representative of nickel compounds disclosed as rubber/metal adhesion promoters in U.S. Pat. No. 3,905,947 as indicated above, and compound No. 4 is a similar monocarboxylate nickel salt.

Evaluation of the adhesion promoters was carried out using a vulcanisable rubber composition of a type known as "skimstock" as follows:

| | Parts by weight |
|---|---|
| Natural rubber | 100 |
| N 347 carbon black | 55 |
| Zinc Oxide | 8 |
| Stearic Acid | 2 |
| Process Oil | 3 |

-continued

| | Parts by weight |
|---|---|
| Tackifier | 3 |
| Antiozonant[1] | 2 |
| Antioxidant[2] | 1 |
| Sulphur | 4 |
| Accelerator[3] | 0.7 |
| Bonding promoter | shown in table below |

[1] N—1,3-dimethylbutyl-N'—phenyl-p-phenylenediamine
[2] Polymerised 2,2,4-trimethyl-1,2-dihydroquinoline
[3] 2(morpholinothio)benzothiazole in Tests Nos. 1, 2, 7, 8, 9 and 10 in the table below. N,N—dicyclohexylbenzothiazole-2-sulphenamide in Tests Nos. 3-6.

Mixing of the ingredients except sulphur and accelerator was done in a laboratory scale Banbury mixer having a capacity of 1.57 liter and operating at a filling factor of about 0.8 and a rotor speed of 117 r.p.m., according to the following schedule:

| Time (mins.) | |
|---|---|
| 0 | Rubber placed in mixer and rotors started. |
| 1 | Half carbon black and zinc oxide added. |
| 2.5 | Remainder of carbon black, stearic acid, process oil, tackifier, antiozonant, antioxidant, bonding promoter added. |
| 4 | Sweep |
| 5 | Dumped at temperature 150 ± 5° C. |

The batch was then transferred to a mill at 70°-75° C. for sheet off. Sulphur and accelerator were added to portions of the masterbatch on a mill as required.

Two types of typical brass-coated steel tire cord were used as the metal component. The first (Cord A) had the construction $3+9+15\times0.175+1$, each cord having a coating of brass, approximately 0.20 micrometer thick, with an average copper content of 63.5% by weight. The second cord (Cord B) had the construction $7\times4\times0.175+0.15$, with a brass coating having an average copper content of 67.5%.

Rubber/metal bond strengths were measured using the adhesion test described by R. C. Ayerst and E. R. Rodger, Rubber Chem. Technol. 45, 1497(1972). In this method, adhesion blocks are prepared in a similar manner to that specified in ASTM D-2229, but using clamping plates to hold the cords in the mould to maintain alignment during cure, and a frame for pre-loading and uniformly stressing the cord before mould building. The adhesion block comprises a strip of rubber having one end each of several uniformly-spaced lengths of cord embedded in one edge of the strip, and a similar array of lengths of cord, each length having one end embedded in the edge of the strip opposite the first edge and in staggered relationship to the cords in the first edge. Pullout adhesion is measured on a tensile tester by arranging the adhesion block so that the cords are vertical and the rubber strip horizontal, and by holding two lower wires and pulling out the upper wire between them at a crosshead speed of 5 cm/min. The pullout force recorded is the mean of the values for each of the several upper cords except those at each end of the strip, which are not taken into account in order to eliminate possible end effects. Where the pullout force exceeds the breaking load of one or more of the wires in the test procedure, this is signified in the Tables by the symbol >.

The results given in the tables below under the headings "Initial Adhesion", "Steam Ageing" and "Salt Bath Ageing" were obtained in adhesion blocks where the rubber was cured at 145° C. for $T_{90}+5$ minutes, "$T_{90}$" being the time in minutes taken for a sample of the same rubber cured in a rheometer (British Standard Test Method 1673 Part 10) to reach 90% of the maximum modulus. Blocks that were "steam aged" were kept in steam under pressure at 120° C. for 8 hours and those that were "salt bath aged" were immersed in a 5% sodium chloride solution at 90° C. for 48 hours after curing and before testing.

In "Steel Cord : Analysis of Used Truck Tires and Simulation of the Found Phenomena in Laboratory Experiments" an article in "Tire Reinforcement and Tire Performance", ASTM STP 694, R. A. Fleming and D. I. Livingston, Eds, American Society for Testing and Materials, 1979, pp 69–86, C. C. J. de Jong concludes that in evaluating tires and other composites containing metal and cord reinforcement, attention should be paid to aged adhesion rather than to initial adhesion. The ageing conditions mentioned above are similar to those proposed by de Jong to simulate, at an enhanced level, various conditions which might be encountered during the service life of a tire.

The results obtained are set out in the following table. Values in parentheses are for the Adhesion Factor which is the pull-out force with adhesion promoter present divided by the pull-out force with the adhesion promoter absent. In Tests Nos. 1 and 2 the cord was Cord B and in Tests Nos. 3-10 the cord was Cord A. The value of the complexes of the invention as rubber/metal adhesion promoters, especially in improving the resistance of the bond to salt bath ageing, is apparent.

| Test No. | Promoter Compound | Promoter Amount phr | Pull-out force in kiloNewtons/meter and Adhesion Factor | | |
|---|---|---|---|---|---|
| | | | Initial Adhesion | Steam Ageing | Salt Bath Ageing |
| 1 | 1 | 1.5 | 53 (1.2) | 37 (1.1) | 270 (1.5) |
| 2 | 5 | 1.5 | 56 (1.2) | 13 (0.4) | 12 (0.7) |
| 3 | 1 | 1.8 | >47 (>1.2) | >42 (0.9) | 40 (1.5) |
| 4 | 2 | 1.8 | >49 (>1.4) | 35 (0.7) | 35 (1.4) |
| 5 | 3 | 2.1 | 42 (1.2) | 47 (0.9) | 38 (1.5) |
| 6 | 4 | 2.2 | >47 (1.3) | 10 (0.2) | 13 (0.5) |
| 7 | 6 | 1.0 | >49 (>1.0) | >54 (1.0) | >47 (1.5) |
| 8 | 7 | 1.0 | 49 (1.0) | 54 (1.0) | — |
| 9 | 7 | 0.6 | — | 47 (1.0) | 37 (1.5) |
| 10 | 8 | 1.0 | — | 46 (1.0) | 37 (1.2) |

We claim:

1. A rubber/metal composite comprising a sulphur-vulcanisable rubber composition containing sulphur and a vulcanisation accelerator, a component having a metal surface in contact with the composition and, as a rubber/metal adhesion promoter, a compound having the formula

$$[^-O_2C\ CH_2S - B - S\ CH_2CO_2^-]\ M^{++}$$

or a hydrate thereof, where B represents a divalent organic radical and M represents cobalt or nickel.

2. A composite according to claim 1, wherein B represents a straight- or branched-chain alkylene group containing from 1 to 16 carbon atoms.

3. A composite according to claim 2 wherein the adhesion promoter is nickel hexane-1,6-bis(thioglycolate) or cobalt hexane-1,6-bis (thioglycolate).

4. A composite according to claim 2, wherein the adhesion promoter is nickel ethane-1,2-bis(thioglycolate).

5. A composite according to claim 1, wherein B represents a straight- or branched chain alkenylene radical containing from 2 to 16 carbon atoms.

6. A composite according to claim 5, wherein the adhesion promoter is nickel 2-butene-1,4-bis(thioglycolate).

7. A composite according to claim 1, wherein B has a structure comprising two or more alkylene units, pairs of such units being linked through an arylene radical.

8. A composite according to claim 7, wherein B has the formula —CH₂ArCH₂— where Ar represents m-phenylene or p-phenylene.

9. A composite according to claim 8, wherein the adhesion promoter is nickel 1,4-xylylenebis(thioglycolate).

10. A composite according to claim 1, wherein B represents a (C₁₋₆-alkylene)cycloalkylene or a (C₁₋₆-alkylene)alkylcycloalkylene group.

11. A composite according to claim 10 wherein the adhesion promoter is

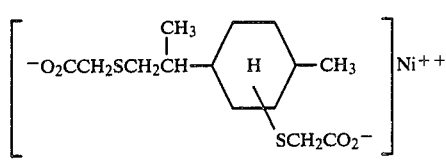

12. A composite according to claim 1 in which the metal surface is a brass surface.

13. A composite according to claim 1 in which the diene rubber is natural or synthetic cis-polyisoprene or a blend of rubbers containing at least 25% by weight of cis-polyisoprene.

14. A composite according to claim 1 in which the amount of adhesion promoter is from 0.5 to 4 parts by weight per 100 parts by weight of rubber.

15. A composite according to claim 1 in which the vulcanisation accelerator is N,N-dicyclohexyl-benzothiazole-2-sulphenamide or 2(morpholinothio)benzothiazole.

16. An article in which vulcanised rubber is bonded to a metal, the article having been obtained by heating a composite according to claim 1 to vulcanise the rubber.

* * * * *